United States Patent
Frisk et al.

(10) Patent No.: US 10,500,729 B2
(45) Date of Patent: Dec. 10, 2019

(54) FENCELESS INDUSTRIAL ROBOT SYSTEM

(71) Applicant: OpiFlex Automation AB, Västerås (SE)

(72) Inventors: Johan Frisk, Täby (SE); Robin Löfgren, Skultuna (SE)

(73) Assignee: OpiFlex Automation AB, Västerås (SE)

( * ) Notice: Subject to any disclaimer, the term of this patent is extended or adjusted under 35 U.S.C. 154(b) by 287 days.

(21) Appl. No.: 15/586,339

(22) Filed: May 4, 2017

(65) Prior Publication Data

US 2017/0320212 A1  Nov. 9, 2017

(30) Foreign Application Priority Data

May 9, 2016  (EP) ..................................... 16168742

(51) Int. Cl.
*G06F 19/00* (2018.01)
*B25J 9/16* (2006.01)
(Continued)

(52) U.S. Cl.
CPC ............... *B25J 9/1676* (2013.01); *B25J 5/00* (2013.01); *B25J 19/02* (2013.01); *B25J 19/06* (2013.01);
(Continued)

(58) Field of Classification Search
CPC . B25J 9/1676; B25J 19/06; B25J 19/02; B25J 5/00; F16P 3/144; F16P 3/142;
(Continued)

(56) References Cited

U.S. PATENT DOCUMENTS 6,958,465 B2 * 10/2005 Haberer .................. G01V 8/20
                                                    209/586
7,368,702 B2 *  5/2008 Kudo ..................... F16P 3/144
                                                    250/221
(Continued)

FOREIGN PATENT DOCUMENTS

DE  102010007027 A1  8/2011
DE  102010046327 A1  3/2012
(Continued)

OTHER PUBLICATIONS

"Dual Check Safety Makes Fenceless Robots Possible", Retrieved from http://motioncontrolsrobotics.com (May 3, 2017).
(Continued)

*Primary Examiner* — Ian Jen
(74) *Attorney, Agent, or Firm* — Seppo Laine Oy

(57) ABSTRACT

The present invention relates to an industrial robot system comprising a platform (1) positioned in a robot cell, an industrial robot (2) positioned on the platform and including an articulated robot arm (6), a sensor system comprising 5 two sensors (4, 5), wherein each of the sensors is configured to detect motions within an angle of at least 90o in a horizontal plane, two arms (10, 12) attached to the platform (1) and arranged to move the sensors (4, 5) in relation to the platform independent of the articulated robot arm between an extended position located a distance of a least 0.5 m from the platform and a 10 retracted position. The sensors are arranged to detect motions of an object within a safety zone and the robot system is configured to adjust the speed of the robot if a moving object is detected in the safety zone.

13 Claims, 3 Drawing Sheets

(51) Int. Cl.
*B25J 5/00* (2006.01)
*B25J 19/02* (2006.01)
*F16P 3/14* (2006.01)
*B25J 19/06* (2006.01)
*G05B 19/4061* (2006.01)

(52) U.S. Cl.
CPC ............ *F16P 3/14* (2013.01); *F16P 3/142* (2013.01); *F16P 3/144* (2013.01); *G05B 19/4061* (2013.01); *G05B 2219/40201* (2013.01); *G05B 2219/40219* (2013.01); *G05B 2219/49141* (2013.01); *Y10S 901/49* (2013.01)

(58) Field of Classification Search
CPC ............ F16P 3/14; G05B 19/4061; G05B 2219/40201; G05B 2219/40219; G05B 2219/49141; Y10S 901/49
See application file for complete search history.

(56) References Cited

U.S. PATENT DOCUMENTS

| | | | |
|---|---|---|---|
| 7,783,386 B2 | 8/2010 | Merte et al. | |
| 7,810,697 B2* | 10/2010 | Charbel | B23K 28/00 228/45 |
| 8,107,058 B2* | 1/2012 | Stein | B25J 9/1674 356/27 |
| 8,249,747 B2 | 8/2012 | Kock | |
| 8,315,735 B2* | 11/2012 | Nihei | B25J 9/1676 318/568.11 |
| 8,583,285 B2* | 11/2013 | Aurnhammer | B25J 9/1674 700/255 |
| 8,788,093 B2 | 7/2014 | Sakakibara et al. | |
| 8,855,812 B2 | 10/2014 | Kapoor | |
| 9,259,839 B2* | 2/2016 | Ogoh | B25J 9/16 |
| 9,278,454 B2* | 3/2016 | Mimura | B25J 13/006 |
| 9,283,678 B2* | 3/2016 | Kuffner, Jr. | B25J 9/1676 |
| 9,579,793 B2* | 2/2017 | Jacob | B25J 9/1676 |
| 10,005,184 B2* | 6/2018 | Gerio | B25J 9/1676 |
| 10,099,372 B2* | 10/2018 | Vu | G01S 17/026 |
| 2001/0037162 A1* | 11/2001 | Matsumoto | B25J 19/06 700/245 |
| 2004/0089793 A1* | 5/2004 | Watanabe | B25J 19/06 250/221 |
| 2008/0021597 A1* | 1/2008 | Merte | F16P 3/141 700/255 |
| 2008/0150467 A1* | 6/2008 | Hashimoto | B25J 9/1676 318/568.17 |
| 2009/0030549 A1* | 1/2009 | Sakai | B25J 9/1676 700/245 |
| 2009/0128079 A1* | 5/2009 | Sjoberg | B25J 13/06 318/568.13 |
| 2010/0179690 A1* | 7/2010 | Matthias | B25J 9/1676 700/253 |
| 2010/0198365 A1* | 8/2010 | Kawabata | G01S 7/4812 700/12 |
| 2011/0052366 A1* | 3/2011 | Bonin | B25J 9/1676 414/800 |
| 2011/0083480 A1* | 4/2011 | Linger | E05B 47/0046 70/77 |
| 2011/0264266 A1* | 10/2011 | Kock | B25J 9/1676 700/253 |
| 2013/0268118 A1 | 10/2013 | Grinstead et al. | |
| 2013/0338829 A1* | 12/2013 | Schlaich | B25J 9/1676 700/253 |
| 2014/0012420 A1* | 1/2014 | Yasue | G05B 19/18 700/264 |
| 2014/0037283 A1* | 2/2014 | Cury | G03B 17/561 396/428 |
| 2014/0207285 A1* | 7/2014 | Sakabe | B25J 9/1697 700/259 |
| 2014/0214201 A1* | 7/2014 | Takemoto | B25J 9/161 700/245 |
| 2014/0309774 A1* | 10/2014 | Chen | G05B 19/41865 700/248 |
| 2015/0032164 A1* | 1/2015 | Crawford | A61B 17/7002 606/279 |
| 2015/0174633 A1* | 6/2015 | Sato | B21D 5/004 483/1 |
| 2015/0308176 A1* | 10/2015 | Oda | E05F 15/40 49/31 |
| 2016/0040827 A1 | 2/2016 | Merx | |
| 2016/0059411 A1 | 3/2016 | Richter et al. | |
| 2016/0062345 A1* | 3/2016 | Stubbs | B25J 5/00 701/2 |
| 2016/0096329 A1* | 4/2016 | Ko | B33Y 30/00 264/129 |
| 2016/0122956 A1* | 5/2016 | Christiansen | B60P 3/0255 180/2.2 |
| 2016/0229062 A1* | 8/2016 | Suzuki | B25J 9/1697 |
| 2016/0295827 A1* | 10/2016 | Axelsson | A01J 5/017 |
| 2017/0010356 A1* | 1/2017 | Demirel | G01B 11/00 |
| 2017/0075196 A1* | 3/2017 | Cury | G03B 17/04 |

FOREIGN PATENT DOCUMENTS

EP 2353799 A2 8/2011
WO WO 2010043640 A2 4/2010

OTHER PUBLICATIONS

T. Anandan, (Oct. 6, 2014) "The Shrinking Footprint of Robot Safety", Robotic Industries Association, Retrieved from http://www.robotics.org (May 3, 2017).

* cited by examiner

US 10,500,729 B2

FENCELESS INDUSTRIAL ROBOT SYSTEM

FIELD OF THE INVENTION

The present invention relates to an industrial robot system comprising a platform, an industrial robot located on the movable platform, a sensor system comprising sensors arranged to detect motions of an object within at least one safety zone defined in relation to the sensors, and a safety control unit configured to adjust the speed of the robot if a moving object is detected in the at least one safety zone.

BACKGROUND OF THE INVENTION

In many small factories the manufacture takes place at different workstations. The workstations may contain one or several fixed machines, a fixture for holding work pieces, or a table. The production can be speeded up if an industrial robot is used to carry out work at the workstations.

WO2010/043640 discloses a robot for performing work at a plurality of workstations. The robot controller is positioned on a movable platform. Each workstation is provided with a docking station to provide a defined and fixed position for the robot in relation to the machine at the workstation. The platform with the robot is moved between the workstations. When the platform with the robot reaches one of the workstations, the platform is attached to the docking station positioned at the workstation. When the robot has finished the work at the workstation, the platform is detached from the docking station, and the platform with the robot is moved to the next workstation.

In factories flexibility and space are important, robot systems need to follow safety regulations to protect humans from injury. Normally fences and doors with safety monitoring are used to meet safety requirements. Fences are in the way and block the machine and take up space.

In order to avoid fences around a robot cell, safety sensors are used in combination with a safety robot motion supervision system and a safety control unit. It is known to have one or more safety zones defined in relation to the sensors, and arranged to detect if a human is entering any of the safety zones. The safety control unit is configured to adjust the speed of the robot upon detecting that a human is entering any of the safety zone. If there is more than one safety zone, the speed of the robot is reduce to zero when the human enters the safety zone closest to the robot.

Fenceless robot system using laser scanners to detect workspace intrusion is, for example, known from "The Shrinking Footprint of Robot Safety" by Tanya M. Anandan, Robotic Industries Association, posted 10/06/2014 October 14-16: robotics.org, "The Shrinking Footprint of Robot Safety".

The robot and the workstation at which the robot performs work are positioned on a movable platform. Four laser scanners are installed at the corners of the movable platform and close to the floor. The laser scanners are scanning horizontally for any approach to the system. As an intrusion gets closer, these scanners tell the robot system to operate slower. In this robot system the robot is performing work on the movable platform and accordingly the working area of the robot is outside the range of the sensors.

However, in most applications, the working area of the robot extends outside the movable platform. A problem with such a robot system is that the sensors cannot distinguish between the robot and a human moving in the working area of the robot. This problem can, for example, be solved by the software safety controller since the position of the robot is known. Another problem is that the movable robot arm can hide the sensor if the robot is working close to the sensor and by that prevent the sensor from sensing a part of the working area.

A problem with having four laser scanners is that they are very expensive. Thus, there is a desire to reduce the number of laser scanners.

US2008021597 discloses an apparatus and method for protection of a robot, having a safety sensor system for detection of objects in the working area of the robot, and a safety controller which interacts with a robot controller based on signals from the safety sensor system. The safety sensor system has a large number of non-contacting proximity sensors fitted to the base of the robot so that a safety-relevant part of the working area of the robot is covered by the detection areas of the proximity sensors. Further, a laser scanner is fitted to the base of the robot and arranged to monitor a rearward part of the working area. The laser scanner together with the non-contacting proximity sensors approximately cover the working area of the robot. Due to the large number of proximity sensors, there is no problem if one of the sensors is hidden since the other sensors will be able to detect an intrusion of human.

US20130268118 discloses a robot system comprising a movable platform provided with drive tracks, a drive system configured to maneuver the movable platform over a work surface, and two articulated robot arms attached to the platform. Each of the articulated robot arms are provided with grippers and sensors, such as gripper cameras. The platform is provided with one or more sensors mounted on the platform to have a field of view directed forward in order to detect obstacles in the direction of movement of the platform.

OBJECT AND SUMMARY OF THE INVENTION

It is an object of the present invention to at least partly overcome the above problems, and to provide a robot system which can be used to perform work in a fenceless robot cell.

This object is achieved by an industrial robot system as defined in claim 1.

The robot system comprises a platform adapted to be positioned on a floor in a robot cell, an industrial robot positioned on the platform and comprising an articulated robot arm, a sensor system comprising two sensors, wherein each of the sensors is configured to detect motions within an angle of at least 90° in a horizontal plane, two arms attached to the platform and arranged to move the sensors in relation to the platform independent of the articulated robot arm between a retracted position and an extended position, and the sensors are located a distance of a least 0.5 m from the platform in the extended position, wherein the sensors are arranged to detect motions of an object within at least one safety zone defined in relation to the sensors when the sensors are located in the extended position, and the robot system comprises a safety control unit configured to adjust the speed of the robot if a moving object is detected in the at least one safety zone.

The sensors can be moved between a retracted position in which they are retracted in relation to the platform, and an extended position in which they are extended in relation to the platform. The sensors are located a distance of a least 0.5 m from the platform in a horizontal direction in the extended position and the sensors are located closer to the platform in a horizontal direction in the retracted position. The sensors are connected to the mobile platform by means of the arms. Thus, the sensors are physically connected to the platform and moves together with the platform when the platform is moved. The arms can, for example, be pivotally attached to the platform or telescopic arms fixedly attached to the platform.

The two arms are arranged to move the sensors in relation to the platform independent of the articulated robot arm. This means that the arms carrying the sensors are moved independent of the motions and the position of the articulated robot arm. Thus, the positions of the sensors are independent of the movements of the articulated arm of the robot, which enables the sensors to continuously supervise the safety zone.

When the sensors are not in use, for example, when the platform with the robot is moved to another robot cell, it is suitable to have the sensors in the retracted position. Suitably, the distance between the sensors and the movable platform in the retracted position is less than 0.1 m in a horizontal direction. When the sensors are in the retracted position, the sensors does not protrude significantly from the platform in a horizontal direction. Thus, the arms and the sensors will be out of the way and will not be an obstacle during movement of the platform, for example, to another robot cell. When the sensors are in the retracted position they are not in use. When the sensors are in the extended position they are in use and. Thus, during operation of the robot the sensors are located in the extended position. The sensors detect motions of an object within at least one safety zone when the sensors are located in the extended position. The sensors are not able to detect motions of an object within the at least one safety zone when the sensors are located in the retracted position. The safety control unit receives measuring data from the sensors when the sensors are located in the extended position, and adjusts the speed of the robot if a moving object is detected in the safety zone. The extended position can vary between different robot cells and for different applications in one robot cell. The extended position can be predefined for a certain robot cell.

Due to the fact that the positions of the sensors are adjustable in relation to the platform independent of the movement of the robot, it is possible to locate the sensors outside the working area of the robot when the robot is in use. Thus, the sensors will not detect the movements of the robot, and by that the problem with distinguish between the movement of a robot and a human moving in the working area of the robot is avoided. Further, due to the fact that the sensors can be located outside the working area of the robot, the risk that the robot will obscuring the sensors is reduced. Thus, the sensors will always cover the area outside the working area of the robot, and the safety-relevant part of the working area of the robot.

Preferably, a base part of the robot is attached to the platform in order to have a fixed position in relation to the platform.

Suitably, the platform is a movable platform. With a movable platform is meant that the platform is designed to facilitate movement of the robot between different work cells. The movable platform may be provided with wheels, but this is not necessary. The platform is always stationary in the robot cell during operation of the robot. For example, the platform is configured to be attached to a fixed docking station positioned in the robot cell. For example, the movable platform is provided with docking members for docking the platform to the docking station.

According to an embodiment of the invention, the sensors are located at a distance less than 0.5 m in a vertical direction from the floor when they are in the extended position. Preferably, the sensors are located at a distance less than 0.3 m in a vertical direction from the floor when they are in the extended position. By locating the sensors close to the floor, the sensors can detect objects moving close to the floor, and by that avoid that the small objects moving close to the floor are not detected. This can be achieved by locating the sensors a distance less than 0.5 m from a bottom part of the platform in the extended position if the bottom part of the platform is resting on the floor. Preferably, the sensors are located at a distance less than 0.3 m from the bottom part of the platform in the extended position.

Preferably, the sensors are arranged so that they in the extended position together cover an angle between 200° and 360° in a horizontal plane around the platform.

According to an embodiment of the invention, the sensors are arranged so that they in the extended position together cover an angle between 290° and 360° in a horizontal plane around the platform.

According to an embodiment of the invention, the sensors are arranged to so that they together cover an angle of 360° in a horizontal plane around the platform in the extended position. Thus, it is possible for the sensors to cover safety zones disposed all the way around the robot.

According to an embodiment of the invention, each of the sensors is configured to detect motions within an angle of at least 250° in a horizontal plane.

According to an embodiment of the invention, each of the sensors is configured to detect motions within an angle of at least 270° in a horizontal plane. This embodiment makes it possible to have only two sensors and still cover an angle of 360° in a horizontal plane around the platform in the extended position. Thus, the number of sensors needed is reduced, and accordingly the costs for the sensors is reduced.

According to an embodiment of the invention, the sensors are arranged on diametrically opposite sides of the platform when they are in the extended position.

According to an embodiment of the invention, the sensors are arranged on diametrically opposite sides of the platform when they are in the extended position so that they together cover an angle of 360° in a horizontal plane around the platform. Both sensors are configured to detect motions within an angle of at least 270° in a horizontal plane. By arranging the sensors on diametrically opposite sides of the platform, it is possible to cover the entire horizontal plane around the platform, when the sensors are in the extended position.

According to an embodiment of the invention, the extended position is located at a distance of a least 0.8 m from the platform. This embodiment makes it possible to have an input or output pallet between the platform and the sensor in the extended position. Thus, the robot can work on the pallet without affecting the sensors.

The robot located on the platform has a defined working area, and suitably, the sensors are located outside the defined working area of the robot, when they are in the extended position. A desired working area for a robot cell is defined beforehand and stored in the safety control unit. The defined working area depends on the movements of the robot, the design of the tool and the design of the work object. The defined working area can vary in different robot cells.

According to an embodiment of the invention, the sensors are located outside the working area of the robot in the extended position, but the sensors are located less than 1 m outside the working area of the robot, preferably the sensors are located less than 0.5 m outside the working area of the robot in the extended position, and most preferably the sensors are located less than 0.2 m outside the working area of the robot in the extended position. The sensor should be located outside the working area of the robot in the extended position to avoid interference with the robot. However, the sensors should preferably be located as close as possible to the border of the working area of the robot, in order to cover as large area as possible.

The sensors can, for example, be laser scanners or cameras.

According to an embodiment of the invention, the sensors are laser scanners. There exist laser scanners that can measure angles up to 270° on the market. Laser scanners are also able to measure long distances, e.g. up to 8 m or more.

The robot system comprises devices for moving the sensors between the retracted position and extended positions. Those devices can be designed in many different ways, for example, extensible devices, foldable devices, and rotatable devices. Suitably, one end of the device is connected to the platform, and the other end of the device supports the sensor.

According to an embodiment of the invention, the platform comprises two arms connected to the platform and arranged to move the sensors between the retracted position and extended positions, and each of the sensors is positioned at an outer part of one of the arms. Suitably, one end of the arm is connected to the platform, and the other end of the arm supports one of the sensors. The arms makes it possible to move the sensors between the retracted position and extended position. The arms can be designed in many different ways, for example, the arms can be extensible, telescopic, folding, or pivotable in order to enable movement of the sensors between the retracted position and extended position.

According to an embodiment of the invention, the platform is rectangular and has a retracted position and a second corner located diametrically opposite each other, and one of the arms is arranged to extend between the first corner and one of the sensors, and the other arm is arranged to extend between the second corner and the other sensor, when the sensors are in the extended position. This embodiment makes it possible to have only two sensors and still cover an angle of 360° in a horizontal plane around the platform in the extended position. Thus, the number of sensors needed is reduced, and accordingly the cost for the sensors is reduced.

According to an embodiment of the invention, the sensors are located on or in close vicinity of the platform in the retracted position. With close vicinity of the platform is meant that the distance between the sensor and the platform is less than 0.1 m.

According to an embodiment of the invention, the arms are at least 0.8 m.

According to an embodiment of the invention, the sensors are configured to detect a part of the mobile platform or a known object in the robot cell, and the sensor system comprises a calibration module configured to determine the positions and directions of the sensors in relation to the mobile platform based on the detected part of the platform or the known object, and to calibrate the robot based thereon. This embodiment makes use of the sensor itself for calibration of the sensor in relation to the platform, and accordingly in relation to the robot. Thus, no extra sensors are needed for calibration of the sensors.

According to an embodiment of the invention, the part of the mobile platform is an edge of the platform.

According to an embodiment of the invention, the sensors are arranged so that the extended position is adjustable. Thus, the positions of the sensor are adjustable in relation to the platform between the retracted position and an adjustable extended positions. This embodiment makes it possible to adjust the positions of the sensors in the extended position so that the positions of the sensors can be varied in dependence on configuration of the present robot cell. The extended position can be varied between different robot cells, and also for different applications in the same robot cell. The working area of the robot may vary in different robot cells. The sensors can be moved in order to adjust to different working areas.

According to an embodiment of the invention, the robot system comprises a plurality of robot cells and the platform is adapted to be moved between the robot cells and to perform work in the robot cells, and the safety control unit is configured to adjusts the size and shape of the at least one safety zone based on which one of the robot cells the robot is located in. When the platform with the robot is within a robot cell, the safety control unit receives information, for example an ID for the robot cell, about in which robot cell the platform is presently located. The safety control unit comprises a data storage including a plurality of predefined configurations of safety zones for a plurality of defined robot cells. The safety control unit receives information about in which robot cell the platform is currently located. The safety control unit selects the safety zone configuration corresponding to the current robot cell. The safety control unit sends the selected safety zone configuration to the sensors. The sensors adjusts the size and shape of the at least one safety zone based on the received safety zone configuration for the current robot cell.

BRIEF DESCRIPTION OF THE DRAWINGS

The invention will now be explained more closely by the description of different embodiments of the invention and with reference to the appended figures.

DETAILED DESCRIPTION OF PREFERRED EMBODIMENTS OF THE INVENTION

Figure 1:
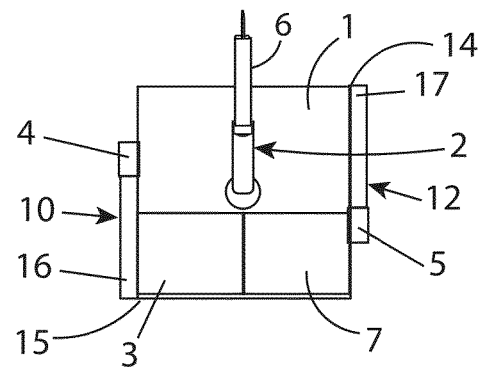
FIG. 1 shows a view from above of an industrial robot system according to a first embodiment of the invention with sensors in a retracted position.

FIGS. 1-4 show an industrial robot system according to an embodiment of the invention. The robot system comprises a platform 1 and an industrial robot located on the platform and having a defined working area. Suitably, the platform 1 is a movable platform designed to facilitate movement of the robot between different work cells.

The robot comprising a manipulator 2 including an articulated robot arm 6 movable relative the platform about a plurality of axes, and a robot controller 3 for controlling the motions of the manipulator 2. The manipulator 2 is about to perform work at workstations, for example, assembling of parts, drilling, grinding or welding. The workstations may contain one or several fixed machines, a fixture for holding work pieces, or a table. The manipulator 2 and the robot controller are positioned on and attached to the platform 1. The manipulator 2 is positioned on an upper side of a platform 1. The platform 1 with the manipulator 2 is moved between different robot cells including different workstations. The manipulator 2 performs work at the workstations in the robot cells.

The robot system comprises a sensor system having two sensors 4, 5 arranged to detect motions of an object within one or more safety zones defined in relation to the sensors. In this embodiment, the sensors 4, 5 are laser scanners configured to detect motions within an angle of at least 270° in a horizontal plane. In another embodiment, the sensors can be a vision system comprising cameras. The robot system also comprises a safety control unit 7 configured to adjust the speed of the robot if a moving object is detected in the at least one safety zone. The safety control unit 7 is, for example, a PLC. The sensors 4, 5 and the robot controller 3 are connected to the safety control unit 7. When the sensor system detects a moving object in any of the safety zones, the safety control unit 7 is informed accordingly. The safety control unit sends an order to the robot controller to reduce the speed of the robot or to stop the robot motions depending on in which zone the moving object is located.

The manipulator 2 includes a stationary base part fixedly attached to the platform, and the articulated arm 6 is movable in relation to the base part about a plurality of axis. In this embodiment, the robot is serial kinematic robot having six axes. The manipulator 2 has three main axes and three wrist axes. The base part supports a stand which is rotatable about a first axis. The stand supports a first link which is rotatable about a second axis. The first link supports a second link which is rotatable about a third axis. The second link supports a wrist part that is rotatable about a fourth, fifth and a sixth axis. The wrist part may support a tool. In other embodiments, other types of serial kinematic robots may be used.

Figure 2:
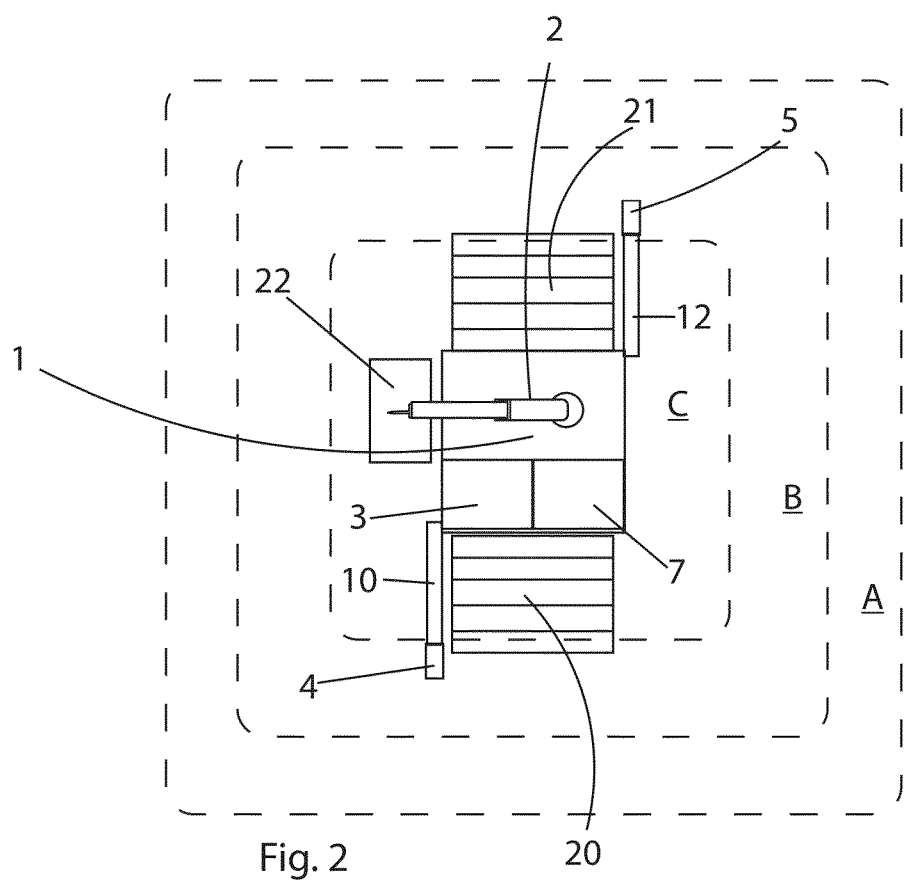
FIG. 2 shows a view from above of an industrial robot system according to the first embodiment of the invention with the sensors in a extended position.

FIG. 2 shows example of a robot system having two defined safety zones A and B. The robot has a working area C. The safety zones A and B are located outside the working area C of the robot. Safety zone A is a low speed zone. When a moving object is detected in zone A, the safety control unit 7 sends an order to the robot controller 3 to slow down the speed of the robot. Safety zone B is a stop zone. When the moving object is detected in zone B, the safety control unit 7 sends an order to the robot controller 3 to stop the robot. Optionally, a third zone may be defined between the zone A and B. When the moving object is detected in the third zone, the safety control unit 7 sends an order to the robot controller 3 to further reduce the speed of the robot.

Figure 3:
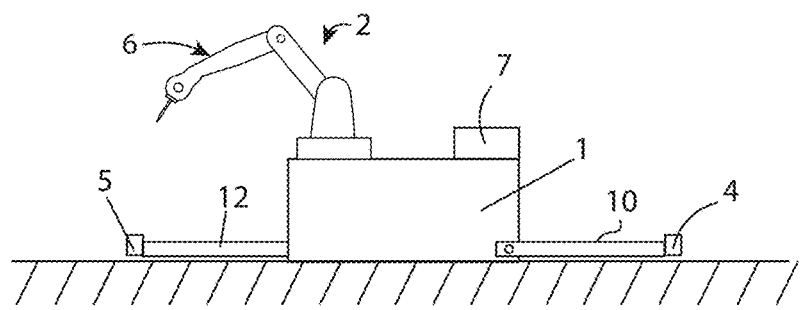
FIG. 3 shows a side view of the industrial robot system shown in FIG. 2.

The sensors 4 and 5 are arranged so that their positions are adjustable in relation to the movable platform between a retracted position, as shown in FIG. 1, and a extended position located at a distance of a least 0.5 m from the platform, as shown in FIGS. 2 and 3. Preferably, sensors are located at a distance of a least 0.8 m from the platform, when they are in the extended position. It is suitable to have the sensors in the retracted position when the sensors are not in use, for example, when the platform with the robot is moved to another robot cell or when it is stored. When the sensors are in the retracted position, the sensors are disposed in the close vicinity of the platform, and will not be any obstacles during movement of the platform. When the sensors are used, such as during operation of the robot, the sensors are in the extended position. Due to the fact that the positions of the sensors 4, 5 are adjustable in relation to the platform 1, it is possible to locate the sensors outside the working area of the robot when the robot is in use.

FIG. 2 shows a view from above of the industrial robot system with the sensors in the extended positions. In this embodiment, the robot cell has three workstations 20, 21, 22: an input pallet 20, an output pallet 21, and a machine 22. The workstations are arranged within the working area of the robot. The sensors 4, 5 are positioned outside the working area of the robot.

In this embodiment of the invention, the platform 1 is provided with two arms 10, 12 connected to the platform and arranged to move the sensors 4, 5 between the retracted position and extended positions. In this example, the arms 4, 5 are non-extendable arms. In an alternative embodiment, the arms can be telescopic arms. In such case, the sensors are arranged so that the extended position is adjustable.

The arms has an outer and an inner part. Each of the sensors 4, 5 are positioned at an outer part of one of the arms, as shown in FIGS. 1 and 2. The inner parts 16, 17 of the arms 10, 12 are connected to the platform 1. The arms are movably connected to the platform 1. In this embodiment, arms 10, 12 are rotatably connected to the platform 1 so that they can be rotated between an extended position, as shown in FIG. 2, 3, and a retracted position, as shown in FIG. 1. The arms are connected to the platform 1 on opposite sides of the platform and in opposite ends of the platform. The arms connected to a lower part of the platform 1 so that the sensors 4, 5 are close to the floor when they are in the extended position. Preferably, the arms 10, 12 are disposed at a distance less than 0.15 m from a lower edge of the platform.

In this embodiment, the platform is essentially rectangular and has four corners. A first corner 14 and a second corner 15 are located diametrically opposite each other. The arm 10 is arranged to extend between the first corner 14 and the sensor 4 when the sensor 4 is in the extended positions, and the arm 12 is arranged to extend between the second corner 14 and sensor 5, when the sensor 4 is in the extended positions. Thus, the sensors are arranged on diametrically opposite sides of the platform when they are in the extended position so that they together cover an angle of 360° in a horizontal plane around the platform, as shown in FIG. 4.

Figure 4:
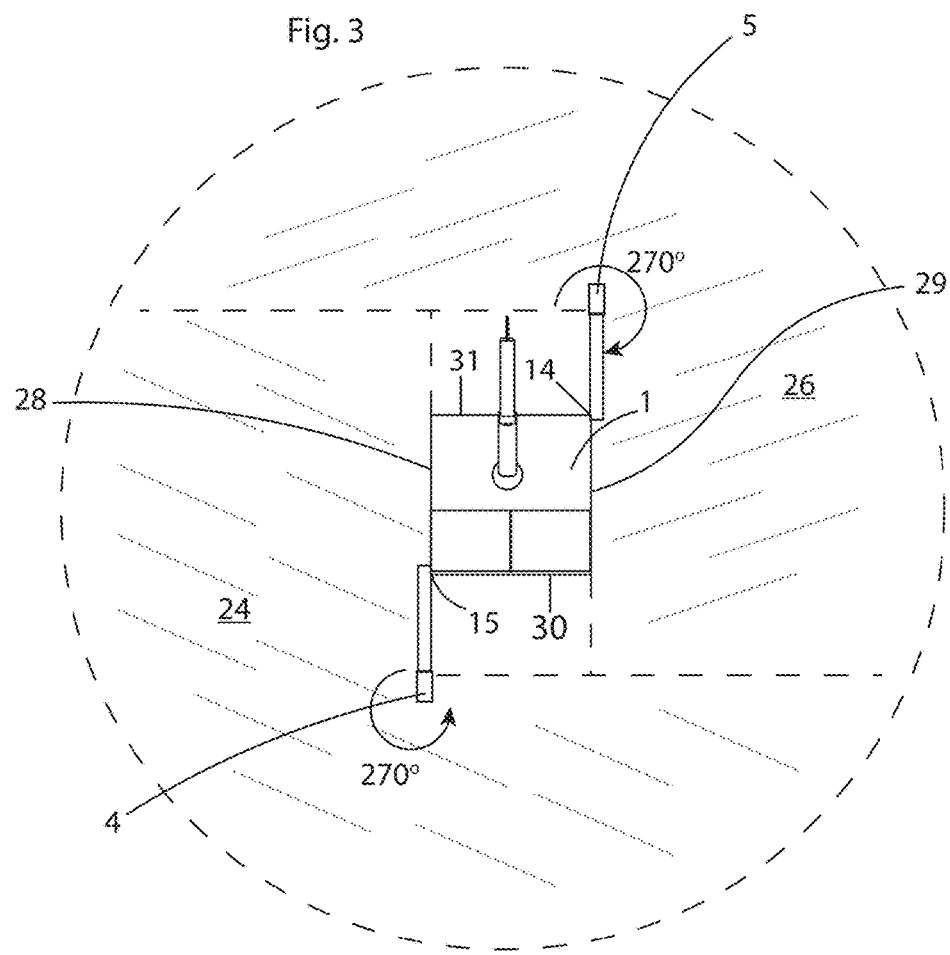
FIG. 4 illustrates the ranges of measurement for the sensors in the extended position for the robot system according to the first embodiment of the invention.

FIG. 4 illustrates the ranges of measurement 24, 26 for the sensors 4, 5 in the extended position. Each of the sensors 4, 5 are capable to detect motions within an angle of at least 270° in the horizontal plane. First sides 28, 29 and second sides 30, 31 of the platform are connected via the first and second corners 14, 15. The first corner 14 and a second corner 15 are located diametrically opposite each other. The sensors 4, 5 are disposed so that they measures along the first sides 28, 29 of the platform and in parallel with the arms 10, 12. The sensors measures within a range of 270° from the first sides 28, 29 towards the second sides 30, 31 of the platform. Thus, the sensors will cover an area around the platform outside the working area of the robot, and also the safety-relevant part of the working area of the robot. Accordingly, the safety zones A, B of the robot cell are located within the measuring range of the sensors.

The sensors need to be calibrated before they are used. This means that the positions and directions of the sensors in relation to the mobile platform need to be determined. This can, for example, be done by using a known fixed object in the robot cell. In one embodiment of the invention, the sensors 4, 5 are configured to detect a part of the mobile platform, for example, an edge of the corners 14, 15 of the platform. The sensor system comprises a calibration module (not shown) configured to determine the positions and directions of the sensors in relation to the mobile platform based on the detected part of the platform and to calibrate the robot based thereon. The sensor system is configured to detect the contour of the object/part of the platform, and to compare the position and orientation of the contour with a predetermined position and orientation of the object/part when the sensor is in a correct position and orientation. If the measured contour corresponds to the correct contour, the sensor is correctly positioned.

The sensors can be moved outside the robot reach, and outside the robot working area so that the robot will not conceal any part of the monitored area. The sensors can be move to facilitate transportation, and also to adjust for different working areas. The sensor system controls that the sensor is in the right position by looking at a reference location or by using other sensors to check that it is in correct location. The monitored area is divided into several zones, warning zone, low speed zone and stop zone. The warning zone warns any person in the zone by visual or acoustic warnings that a moving robot is ahead. When a person cross the boundary for the low speed zone, the robot reduce the speed to a safe speed, e.g. 250 mm/s. The distance for the low speed zone is calculated based on persons moving speed, robot stop time and safety zone if the robot crosses a boarder. The distance for the low speed zone is normally 1.6-2.5 m outside the working area of a robot. When a person cross the boundary for the stop speed zone, the robot goas in to safety stop and stops quickly. The safety robot motion supervision system dynamically informs the safety control unit which work areas are affected by robot, tool and work object. The safety control unit tells the sensor system what zones to be set for warning zone, low speed zone and stop zone.

Optionally, the safety control unit can also be configured to adjust the size and shape of the safety zones A, B based on which robot cell the robot is located in.

Figure 5A:
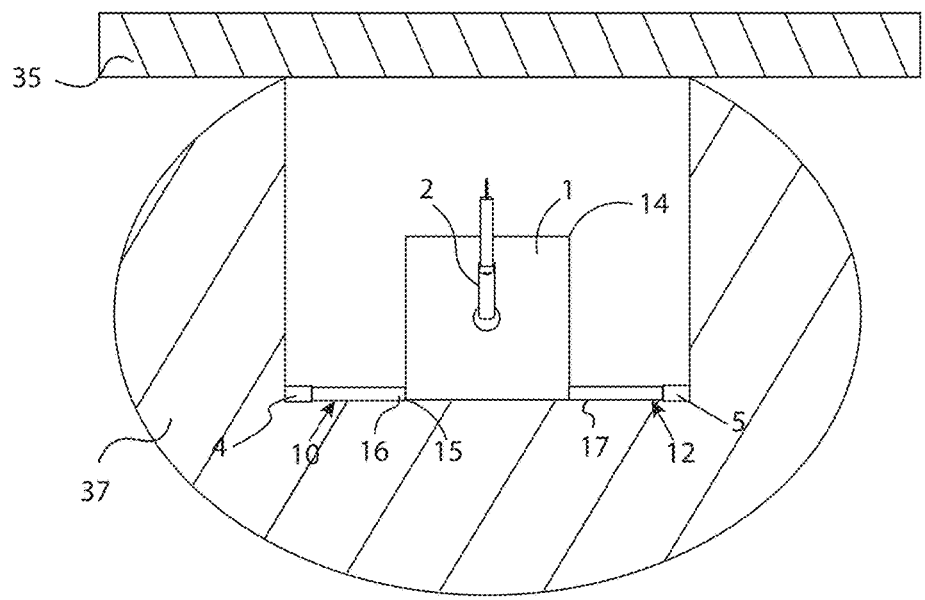
FIG. 5A shows a view from above of an industrial robot system according to a second embodiment of the invention with sensors in a extended position.
Figure 5B:
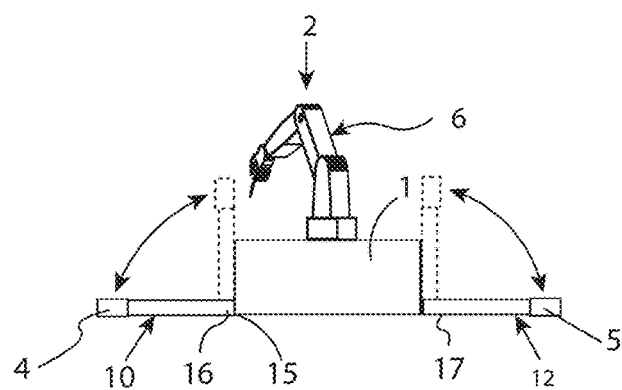
FIG. 5B shows a side view of the industrial robot system shown in FIG. 5A.

FIG. 5A shows a view from above of an industrial robot system according to a second embodiment of the invention with sensors in an extended position. FIG. 5B shows a side view of the industrial robot system shown in FIG. 5A. Components corresponding to those in the previous figures have been given the same reference numerals, and will not be described in more detail here. This embodiment differs from the first embodiment in that the arms 10, 12 are disposed on a rear side of the platform, and the arms are pivotable between a horizontal and a vertical position. The sensors 4, 5 are located in the extended position when the arms are located in the horizontal position, and the sensors 4, 5 are located in the retracted position when the arms are located in the horizontal position. This embodiment is, for example suitable when the platform 1 and the robot is positioned close to a wall 35, as shown in FIG. 5A. In this example, the sensors detects about 270° in the horizontal plane. FIG. 5A illustrates the range 37 of measurement for the sensors 4, 5 in the extended position. Due to the wall, it is not necessary to cover a range of 360° around the robot.

The present invention is not limited to the embodiments disclosed but may be varied and modified within the scope of the following claims. For example, the number of sensors can be more than two. For example, it is possible to have more than one sensor on each arm. In such case, the sensors can be configured to detect motions within an angle less than 270° in a horizontal plane. It is also possible to have more than two arms provided with sensors.

The invention claimed is:

1. An industrial robot system comprising:
   a platform adapted to be positioned on a floor in a robot cell,
   an industrial robot positioned on the platform and including an articulated robot arm,
   a sensor system comprising two sensors, wherein each of the sensors is configured to detect motions within an angle of at least 90° in a horizontal plane, and
   two arms attached to the platform and arranged to move the sensors in relation to the platform independent of the articulated robot arm between a retracted position and an extended position and the sensors are located a distance of a least 0.5 m from the platform in the extended position,
   wherein the sensors are arranged to detect motions of an object within at least one safety zone defined in relation to the sensors when the sensors are located in the extended position, and the robot system comprises a safety control unit configured to adjust the speed of the robot if a moving object is detected in the at least one safety zone.

2. The robot system according to claim 1, wherein the sensors in the extended position are located at a distance less than 0.5 m from the floor in a vertical direction.

3. The robot system according to claim 1, wherein the sensors in the extended position are located at a distance less than 0.3 m from the floor in a vertical direction.

4. The robot system according to claim 1, wherein the robot has a defined working area and the sensors are located outside the working area of the robot in the extended position.

5. The robot system according to claim 1, wherein the sensors are arranged so that the two sensors in the extended position together cover an angle of 360° in a horizontal plane around the platform.

6. The robot system according to claim 1, wherein each of the sensors is configured to detect motions within an angle of at least 250° in a horizontal plane, and preferably each of the sensors is configured to detect motions within an angle of at least 270° in a horizontal plane.

7. The robot system according to claim 1, wherein the two sensors are arranged on diametrically opposite sides of the platform when the two sensors are in the extended position so that they together cover an angle of 360° in a horizontal plane around the platform.

8. The robot system according to claim 1, wherein the extended position is located at a distance of at least 0.8 m from the platform in a horizontal direction.

9. The robot system according to claim 8, wherein the sensors are located less than 1 m outside the working area of the robot in the extended position, preferably the sensors are located less than 0.5 m outside the working area of the robot in the extended position, and most preferably the sensors are located less than 0.2 m outside the working area of the robot in the extended position.

10. The robot system according to claim 1, wherein the sensors are located on or in close vicinity of the platform in the retracted position.

11. The robot system according to claim 1, wherein the platform is rectangular and has first and second corners located diametrically opposite each other, and one of the arms attached to the platform is arranged to extend between the first corner and one of the sensors, when the sensor is in the extended position, and the other arm attached to the platform is arranged to extend between the second corner and the other sensor, when the sensor is in the extended position.

12. The robot system according to claim 1, wherein said platform is a movable platform.

13. The robot system according to claim 12, wherein the robot system further comprises a plurality of robot cells and the movable platform is adapted to be moved between the robot cells and to perform work in the robot cells, and the safety control unit is configured to adjusts the size and shape of the at least one safety zone based on which one of the robot cells the robot is located in.

* * * * *